United States Patent
Boncimino (10) Patent No.: US 11,483,309 B2
(45) Date of Patent: Oct. 25, 2022

(54) FACE-RECOGNITION FOR A VALUE TRANSFER

(71) Applicant: Visa International Service Association, San Francisco, CA (US)

(72) Inventor: Christopher Dennis Boncimino, Singapore (SG)

(73) Assignee: Visa International Service Association, San Francisco, CA (US)

(*) Notice: Subject to any disclaimer, the term of this patent is extended or adjusted under 35 U.S.C. 154(b) by 301 days.

(21) Appl. No.: 16/725,184

(22) Filed: Dec. 23, 2019

(65) Prior Publication Data

US 2020/0228525 A1 Jul. 16, 2020

Related U.S. Application Data (60) Provisional application No. 62/793,218, filed on Jan. 16, 2019.

(51) Int. Cl.
| | | |
|---|---|---|
| *H04L 29/06* | (2006.01) | |
| *H04L 9/40* | (2022.01) | |
| *G06F 16/532* | (2019.01) | |
| *G06V 40/16* | (2022.01) | |

(52) U.S. Cl.
CPC ........ *H04L 63/0861* (2013.01); *G06F 16/532* (2019.01); *G06V 40/172* (2022.01); *H04L 63/102* (2013.01)

(58) Field of Classification Search
None
See application file for complete search history.

(56) References Cited

U.S. PATENT DOCUMENTS

| | | | |
|---|---|---|---|
| 9,881,295 B1* | 1/2018 | Buddhavarapu | ............................. G06Q 20/40145 |
| 10,218,708 B1* | 2/2019 | Butler | ................. H04L 63/0428 |
| 2011/0249144 A1 | 10/2011 | Chang | |
| 2012/0158582 A1 | 6/2012 | Nuzzi | |
| 2019/0222570 A1* | 7/2019 | Krishan | .................. G06F 21/35 |
| 2020/0228524 A1* | 7/2020 | Szafranski | .............. G06F 21/32 |

OTHER PUBLICATIONS

"Extended European Search Report" for EP Application No. 20151819.8 dated Jun. 9, 2020, 8 pages.
Sheets et al., "Server-Assisted Privacy Protecting Biometric Comparison", U.S. Appl. No. 16/769,425, filed Jul. 25, 2018.

* cited by examiner

*Primary Examiner* — Piotr Poltorak
(74) *Attorney, Agent, or Firm* — Kilpatrick Townsend & Stockton LLP (57) ABSTRACT

A system and method are provided which include receiving, from a first user, first image data of a second user and a request to provide a value for the second user; storing the first image data of the second user in association with the value; transmitting, to the second user, a notification that the value is available; receiving, from an access device, an authorization request message comprising access data and second image data of the second user; determining a result based on (a) whether the first image data of the second user matches the second image data of the second user and (b) the stored value; and transmitting, to the access device, an authorization response message comprising the result.

18 Claims, 6 Drawing Sheets

FACE-RECOGNITION FOR A VALUE TRANSFER

CROSS-REFERENCE TO RELATED APPLICATIONS

This application is a nonprovisional application, which claims priority to U.S. Provisional Application No. 62/793,218, filed on Jan. 16, 2019, which is herein incorporated by reference in its entirety.

BACKGROUND

Biometrics may be used to authenticate or identify an individual. In some instances, facial recognition may be used to authenticate an individual. A biometric template may be generated based the individual's face. The biometric template may be stored. The user may later attempt to perform some action. An image of the individual may be acquired, converted to a biometric template, and compared to the stored biometric template.

Users commonly experience friction when one user wishes to transfer value to another user. For example, if Mary wants to give a gift card to Joe, she might have to send him a physical card. This creates security risks, as the card could get lost in the mail or stolen. Mary could send Joe an electronic gift card, but in either case, Joe would have to keep track of an identifier (e.g., the physical card, e-card number, quick response code, etc.) in order to redeem the associated value.

Embodiments address these and other problems, individually and collectively.

BRIEF SUMMARY

The methods described herein provide a way to manage a value transfer via face-recognition.

Embodiments include a method comprising: receiving, from a first user, first image data of a second user and a request to provide a value for the second user; storing the first image data of the second user in association with the value; transmitting, to the second user, a notification that the value is available; receiving, from an access device, an authorization request message comprising access data and second image data of the second user; determining a result based on (a) whether the first image data of the second user matches the second image data of the second user and (b) the stored value; and transmitting, to the access device, an authorization response message comprising the result.

In some aspects, the result is further determined based on comparing location data received from the access device to location parameters stored in association with the value. In some aspects, the result is to grant access to a resource based on determining that the first image data of the second user matches the second image data of the second user; and the method further comprises decrementing the stored value based on the access data. In some aspects, the second image data comprises a digital image received from a user device operated by the first user. In some aspects, the access device is a first access device, and the first image data comprises a biometric template received from a second access device.

In some aspects, the first image data and the request to provide the value are received from an application on a user device operated by the first user, wherein the application and the access device are associated with a resource provider. In some aspects, determining whether the first image data of the second user matches the second image data of the second user comprises: comparing the first image data of the second user to the second image data of the second user; determining a confidence score based on the comparison; determining that the confidence score exceeds a threshold; and based on determining that the confidence score exceeds the threshold, determining that the first image data of the second user matches the second image data of the second user.

In some aspects, determining whether the first image data of the second user matches the second image data of the second user comprises: comparing the first image data of the second user to the second image data of the second user; determining a confidence score based on the comparison; determining that the confidence score does not exceed a threshold; and based on determining that the confidence score does not exceed the threshold, determining that the first image data of the second user does not match the second image data of the second user.

In some aspects, determining whether the first image data of the second user matches the second image data of the second user comprises: comparing the first image data of the second user to the second image data of the second user; determining a confidence score based on the comparison; determining that the confidence score exceeds a first threshold and the confidence score does not exceed a second threshold; and based on determining that the confidence score exceeds the first threshold and the confidence score does not exceed the second threshold, initiating a request for supplemental information. In some aspects, determining the result based on the stored value comprises: identifying an amount based on the access data; comparing the amount to the stored value; and determining that the stored value meets or exceeds the amount.

Embodiments include a server computer comprising: a processor; and a non-transitory computer readable medium operatively coupled to the processor, the non-transitory computer readable medium comprising code executable by the processor for performing any of the methods described above.

Embodiments include a method comprising: receiving, by an access device, access data and second image data of a second user; preparing, by the access device, a request message comprising the access data and the second image data of the second user; transmitting, by the access device to a server computer, the request message, wherein the server computer compares the second image data of the second user to first image data of the second user, wherein the first image data was received from a first user with a request to provide a value for the second user, and wherein the server computer transmits a response message to the access device indicating whether the request is approved or declined based on the comparison; and receiving, by the access device from the server computer, the response message indicating whether the request is approved or declined.

DETAILED DESCRIPTION

Prior to discussing various embodiments, some terms can be described in further detail.

A "user" may include an individual. In some embodiments, a user may be associated with one or more personal accounts and/or user devices. The user may also be referred to as a cardholder, account holder, or consumer in some embodiments.

A "user device" may be any suitable device that may be operated by a user. User devices may include cellular phones, personal digital assistants (PDAs), pagers, tablets, personal computers, and the like. As additional examples, user devices may include wearable devices (e.g., watches, rings, etc.). A user device may comprise any suitable hardware and software for performing such functions, and may include multiple devices or components.

An "access device" may be any suitable device for obtaining access to a resource. An access device may generally be located in any suitable location, such as at the location of a merchant. An access device may be in any suitable form. Some examples of access devices include point of sale (POS) devices, cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a portable device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "resource provider" can be any suitable entity that provides resources (e.g., goods, services, access to secure data, access to locations, or the like) during a transaction. For example, a resource provider can be a merchant, a venue operator, a building owner, a governmental entity, etc. A "merchant" may typically be an entity that engages in transactions and can sell goods or services, or provide access to goods or services.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may include image data. In another example, a biometric sample of a user's voice may include audio data.

A "biometric template" or "biometric sample template" may include a file containing distinct characteristics extracted from a biometric sample that may be used during a biometric authentication process. For example, a biometric template may be a binary mathematical file representing the unique features of an individual's face, fingerprint, eye, hand or voice needed for performing accurate authentication of the individual.

"Image data" may include information associated with an image. Image data may be an electronic image file (e.g., a JPEG, GIF, BMP, etc.). Image data may include a physical image (e.g., a photograph developed or printed on paper). Image data may include a biometric template generated based on an image. Image data may include information which is used to retrieve an image. For example, based on a link to a social media profile of an individual, an electronic image file of that individual may be retrieved.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access data in some embodiments. Such information may be ticket information for an event, data to access a building, transit ticket information, etc.

An "authorizing entity" may be an entity which can authorize or approve interactions. Examples of an authorizing entity may be an issuer, a governmental agency, a document repository, an access administrator, etc. An authorizing entity may operate an "authorizing computer." An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "acquirer" may be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be referred to as a "transport computer."

An "authorization request message" may be an electronic message that requests authorization for a transaction. In some embodiments, it is sent to a transaction processing computer and/or an issuer of a payment card to request authorization for a transaction. An authorization request message, according to some embodiments, may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. point of sale equipment) that indicates approval of the transaction. The code may serve as proof of authorization.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "payment processing network" may be a network used to process transactions. A payment processing network can be a system that may comprise one or more servers, data processing subsystems, networks, and operations used to support and deliver authorization services, exception file services, and clearing and settlement services. A payment processing network may be able to process one or more of credit card transactions, debit card transactions, installment plans, or any other type of commercial transaction. An example of a payment processing network may include, for example, VisaNet™. A payment processing network may operate one or more "network computers."

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

Details of some embodiments will now be described.

Figure 1:
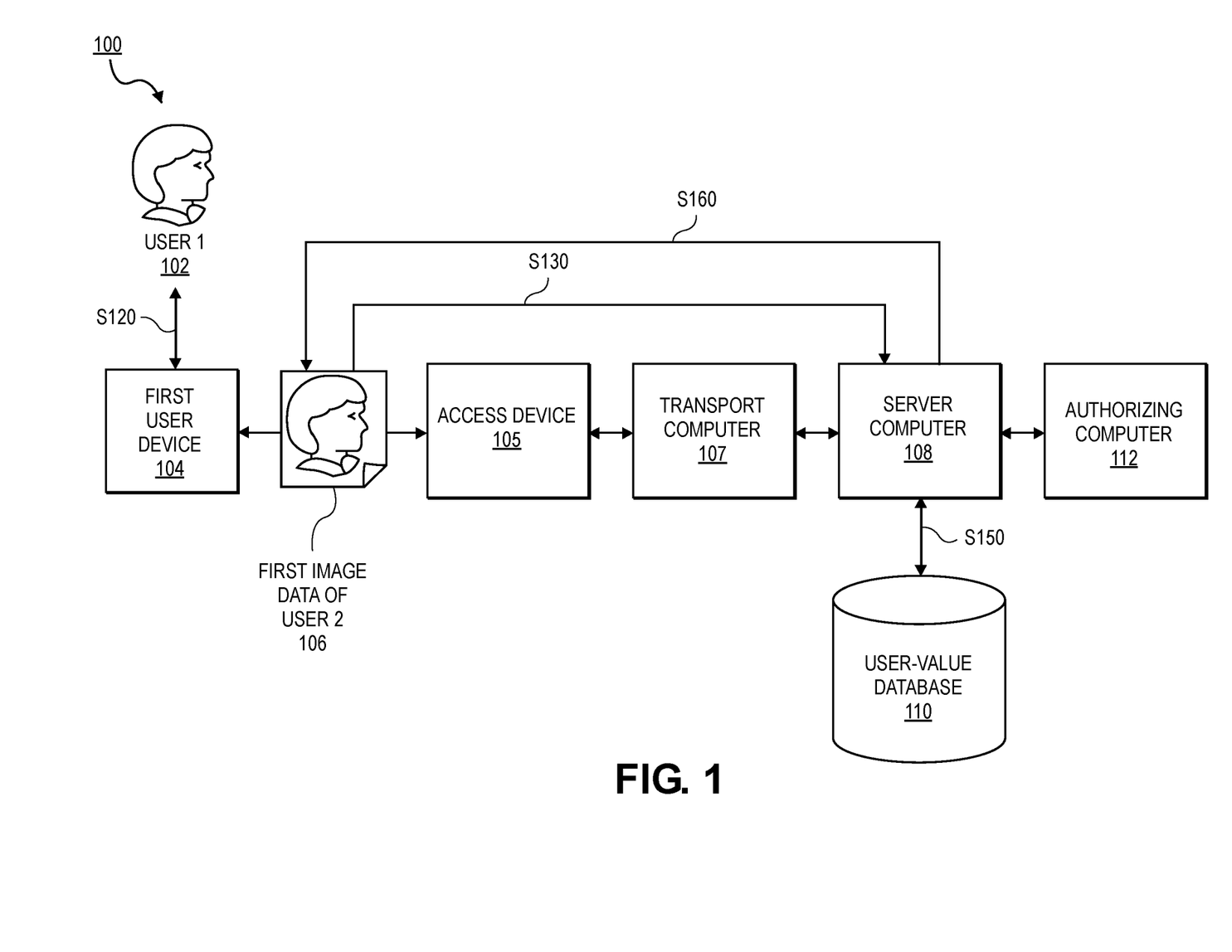
FIG. 1 shows a schematic diagram illustrating techniques for managing a value transfer via face-recognition according to some embodiments.

FIG. 1 shows a schematic diagram 100 illustrating techniques for managing a value transfer via face-recognition according to some embodiments. The system depicted in FIG. 1 may facilitate a first user, "user 1" 102 transferring a value redeemable by a second user, "user 2" via face-recognition. The first user may be referred to as the transferor and the second user may be referred to as the recipient. The system depicted in FIG. 1 may include a first user device 104, a server computer 108, a user-value database 110, an access device 105, a transport computer 107, and an authorizing computer 112.

The components in the system depicted in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments may include more than one of each component. For example, there can be a plurality of access devices 105 in operative communication with the transport computer 107 and/or the server computer 108.

The first user device 104 may be a device operable by a user (e.g., user 1 102) and capable of executing applications. As examples, the first user device 104 may be a smartphone, a computer, a tablet, or the like. The first user device 104 may also include hardware and/or software configured to store data. The first user device 104 may also include hardware and/or software configured to accept data from a user. The first user device 104 may include hardware and/or software configured to transmit data to the server computer 108. The first user device 104 may also be connected to the server computer 108 via a communication network, directly, or by way of access device 105 and transport computer 107. The first user device 104 may also include hardware and/or software capable of receiving user input. The first user device 104 may also include a keyboard, touchscreen, microphone, and/or the like for receiving data from a user.

The server computer 108 may include functionality to manage value transfers based on image data. The server computer 108 may also include hardware and/or software configured to receive images and analyze images. The server computer 108 may also include functionality to generate and/or analyze a biometric template. The server computer 108 may also include functionality to manage the storage of image data in association with value data. Further detail about a server computer such as server computer 108 is described in further detail below with respect to FIG. 5.

The user-value database 110 may be a storage unit and/or device (e.g., a file system, database, collection of tables, or other storage mechanism) for storing data. The user-value database 110 may include multiple different storage units and/or devices. The user-value database 110 may store values (e.g. an amount on a gift-card, prepaid card, or the like). The user-value database 110 may store the values in connection with image data, which may comprise an image of a user and/or a biometric template based on an image of a user. The user-value database 110 may store additional user-defined configuration data, such as a location restriction, in association with some or all of the values.

The access device 105 may be any suitable access device, such as a merchant point-of-sale (POS) system, access system, Website, etc. The access device 105 may include functionality for receiving and transmitting data. The access device 105 may include functionality for capturing an image, such as a camera. In some embodiments, the access device 118 may include software capable of supporting processing of biometric samples. The access device 118 may be capable of converting a biometric sample into a biometric template.

In some embodiments, the system may further include transport computer 107. The transport computer may forward messages between access device 105 to server computer 108.

In some embodiments, the system may further include an authorizing computer 112 for executing authorization operations. For example, authorizing computer 112 may receive authorization request messages in order to identify whether funds are available in an account of user 1 102 to fund a requested value for the second user, and determine whether to approve or decline authorization requests.

At step S120, user 1 102 may interact with first user device 104 to initiate a value transfer to the second user. User 1 102 may initiate the value transfer, for example, via an application or website. An example interface for initiating a value transfer is illustrated in, and described below with respect to, FIG. 2.

User 1 102 may provide, to first user device 104 and/or access device 105, first image data of user 2 106. For example, user 1 102 may be adding value to gift instrument for a friend, user 2. User 1 102 may have images of user 2 on his phone. As another example, user 1 102 may take a picture of someone and upload the picture (e.g., to send value to someone he want to introduce himself to at a bar). The first image data may include a biometric sample comprising an image of the second user's face (e.g., JPEG file or the like). The first image data may further include image metadata (e.g., gathered by first user device 104). For example, the first image data may include image metadata such as lighting information, International Organization of Standardization (ISO) setting information, shutter speed information, and so forth.

In some embodiments, the first image data provided by user 1 102 may include information which the server computer 108 can use to retrieve one or more images of user 2. For example, based on a name, social media user name, link to a social media page, email address, and/or the like, the server computer may retrieve one or more images on the Internet.

Along with the first image of user 2 106, user 1 102 may input a value to transfer to user 2 on a website or application associated with the server computer 108. For example, user 1 102 may input, to a text entry field on a website or application associated with the server computer 108, a dollar amount to confer to another (e.g., $10, $50, $100, and so forth). Although an amount in dollars is provided as an example, the value may be in any currency. The value may correspond to an amount that the first user wishes to give to the second user. For example, the value may correspond to an amount to load on gift instrument such as a gift card, a prepaid card, store credit, a merchant value certificate, and so forth. As another example, the value may correspond to a value to assign as available to the second user from an account of user 1 102. For example, user 1 102 may permit the second user to buy $50 worth of items from a hardware store using a credit account of user 1 102.

In some embodiments, user 1 102 may input additional information on a website or application associated with the server computer 108. For example, user 1 102 may input payment information for funding the value transfer (e.g., a primary account number, CVV, token, and/or the like) on a website or application associated with the server computer 108.

In some embodiments, user 1 102 may further provide configuration data on a website or application associated with the server computer 108. For example, the configuration data may specific that the value may be associated with restricted-use based on factors such as location, time, daily spending limits, or the like. As a specific example, a person may give a friend a gift card by uploading the friend's photo to the server computer 106, specifying a value of $50 for the gift card, and applying the restriction that the gift card is only redeemable in the state of Idaho. As another example, an employer may give an employee a $200 store credit to buy construction supplies by presenting a printout of the employee's photo at a POS terminal at a hardware store, specifying an amount of $200, and restricting the purchase to that store location. The POS terminal may transmit this information to the server computer 108. As another example, user 1 102 may input a time period to the server computer 106, so that the value may be restricted to use within a certain time period (e.g., the value is redeemable within one day, one month, one year, and so forth).

In some embodiments, user 1 102 may further provide contact information for user 2 to the server computer 106, so that user 2 may be notified of the value transfer. For example, user 1 may input, via an interface associated with the server computer 108, information such as a phone number, email address, full name, home address, and so forth, for user 2.

The data received and stored on the first user device 104 may include a first image of user 2 106. The first image of user 2 106 may be a digital image of user 2 112. Alternatively, or additionally, the first user device 104 may store other types of image data associated with user 2, such as a biometric template generated based on an image of user 2.

In some embodiments, the first image of user 2 106 and/or the value may be submitted by user 1 to the server computer 106 without the use of the first user device 104. For example, user 1 may present a print photo of user 2 at access device 105, e.g., at a merchant store. The access device 105 may then transmit data for the photo to the server computer 108.

At step S130, the information received at step S120 is transmitted to the server computer 108. Such information may include the first image of user 2 106, the value to transfer, payment information, and/or configuration data which may be used to restrict redemption of the value. In some embodiments, first user device 104 may transmit the information to the server computer 108 directly. Alternatively, first user device 104 may transmit the information to access device 105, access device 105 may transmit the information to transport computer 107, and transport computer 107 may transmit the information to server computer 108. In either event, the information may be transmitted via, for example, one or more messages and/or application programing interface (API) pushes over a network.

In some embodiments, upon receiving image data in the form of a biometric sample, the first user device 104 and/or access device 105 may generate a biometric template and transmit the biometric template to the server computer 108. For example, the access device 105 may identify and extract features from the biometric sample. The access device 105 may convert the extracted features to the biometric template. The biometric sample or the biometric template may correspond to the first image data.

The server computer 108 may receive, from user 1 102 (via the first user device 104, the access device 105, and/or the transport computer 107), the transmitted information including first image data of user 2 106 and a request to provide a value for the second user.

In some embodiments, server computer 108 may assess the quality of the image data received. Server computer 108 may process the image data to ensure an adequate biometric template is stored for future matching operations. Because the image data received may be derived from a snapshot, rather than a formal face scan or passport photo, additional processing may be appropriate to generate a biometric template for storage.

For example, if user 1 uploaded a photo that is dark or grainy, or includes multiple faces, then the server computer 108 may transmit a notification to the first user device 104, indicating that additional information is required. Additional information which may be requested and used to supplement the initially received first image data may include a name, email address, and/or social media user name or link for user 2. The additional information requested may include another image (e.g. prompting user 1 102 to provide a more clear photo). As another example, the server computer 108 may cause the first user to be prompted via the first user device 104 to provide input indicating which of several faces in an image belongs to user 2.

In some embodiments, the server computer 108 may generate image data for user 2 based multiple received images. For example, the server computer 108 may receive several images of user 2 from the first user 1 or from other sources, and use the images to generate a biometric template. The server computer may generate a biometric template-using techniques such as principle component analysis (PCA), support vector machines (SVM), linear discriminant analysis (LDA), kernel methods, trace transforms, and so forth. Alternatively, or additionally, the server computer may analyze, using one or more received images, local facial features and the geometric relationship between the facial features. As a specific example, the server computer may extract a set of facial features from one or more received images using a neural network, such as a feed forward neural network or a fuzzy neural network.

In some embodiments, the server computer 108 may retrieve one or more images of user 2 from one or more external sources based on received image data. As an example, the server computer 108 may receive a user name or link associated with a social media profile of user 2. The server computer 108 may navigate to a corresponding uniform resource locator (URL) and retrieve images of user 2 from the URL. As another example, the server computer 108 may receive a name, and search the Internet for the name of user 2. The server computer 108 may identify images on the Internet in association with the name of user 2. In the event of ambiguity (e.g., multiple individuals with a same name), the server computer 108 may transmit a message to user 1 102 (e.g., via first user device 104 and/or access device 105) requesting confirmation and/or supplemental information. As an example, server computer 108 may transmit a message to first user device 104 requesting supplemental information—"Please provide John Smith's city of residence and approximate age." As another example, server computer 108 may transmit a message to access device 105 requesting confirmation, e.g., cause an in-store terminal to display an identified image of an individual with the words "Is this Mary Won?". The server computer 108 may thereby receive supplemental information and use the supplemental information to resolve any ambiguities in identifying an image of user 2 on the Internet. The server computer 108 may use a retrieved image to extract features and/or generate a biometric template. The server computer 108 may use one or more retrieved images to supplement, or in lieu of, an image that was initially received.

The server computer 108 may further receive payment information (e.g., a credit card number, bank account number, a notification of received cash, etc.), which is charged an amount corresponding to the specified value. The server computer 108 may receive the payment information in an authorization request message. The server computer may identify, based on information in the authorization request message (e.g., an issuer identifier), an appropriate authorizing computer to which to transmit the authorization request message.

At step S140, the server computer 108 may transmit the authorization request message to authorizing computer 112. Authorizing computer 112 may identify an account of user 1, and determine whether to approve or decline the authorization request. The authorizing computer 112 may authorize the transaction based whether there are sufficient funds in the account of the first user 1.

Once the authorization decision is made by the authorizing computer 112, the authorizing computer 112 may transmit an authorization response message to the server computer 108. The authorization response message may indicate whether the authorization request is approved or declined (e.g., whether to transfer the value from user 1 to user 2).

At step S150, the server computer 108 may store the first image data of user 2 106 in association with the value. The server computer 108 may store the first image data of user 2 106 in connection with the value in the user-value database 110. The server computer 108 may establish a mapping between the first image data of user 2 106 and the value for storage to the user-value database 110.

Any configuration data specified by user 1 102 may further be stored in connection with the value. In some embodiments, the server computer 108 may establish restrictions or rules based on the received configuration data. For example, the server computer 108 can receive a zip code from the user 1 102. Based on the received zip code, the server computer 108 generates one or more rules establishing geofencing restrictions, which are stored to the user-value database in association with the corresponding image data and the value.

In some embodiments, server computer 108 stores the first image data of user 2 106, the value, and any additional configuration data if the authorization response message received indicates that the authorization request is approved. For example, the server computer 108 may store the first image data in association with the value and location parameters (e.g., a zip code for enforcing geofencing). Server computer 108 may refrain from storing the first image data of user 2 106, value, and any additional configuration data if the authorization response message received indicates that the authorization request is declined.

In some embodiments, the server computer 108 may establish a new account for storing in association with the value and image data. For example, server computer 108 may generate a new account identifier (e.g., an account number for an electronic gift card or store credit). In this case, funds may be transferred from the authorizing computer 112 to an account associated with the new account identifier. Alternatively, the vale may be stored simply based on the image data without the need for an additional account identifier. Alternatively, or additionally, the value may be linked to an existing account of user 1 102. The server computer 108 may store a record indicating an amount (e.g., the value), out of the total amount available in the existing account, which user 2 may access. As a specific example, user 1 102, an employer, may specify that user 2, an employee of user 1 102, can spend $50 at an office supply store on Jan. 1, 2020 via user 1's credit account at the office supply store. In this case, a hold may be placed on the credit account of user 1 for the amount to be spent (e.g, $50). When the employee uses her image to redeem the $50 at the office supply store, an authorization request message with the amount may be transmitted to the server computer 108 and the authorizing computer 112 and the hold on $50 may be removed.

In some embodiments, server computer 108 may transmit the authorization response message to the transport computer 107, access device 106, and/or first user device 104. Alternatively, or additionally, server computer 108 may transmit a notification to the first user device 104 that the value has been transferred to the second user.

Figure 2:
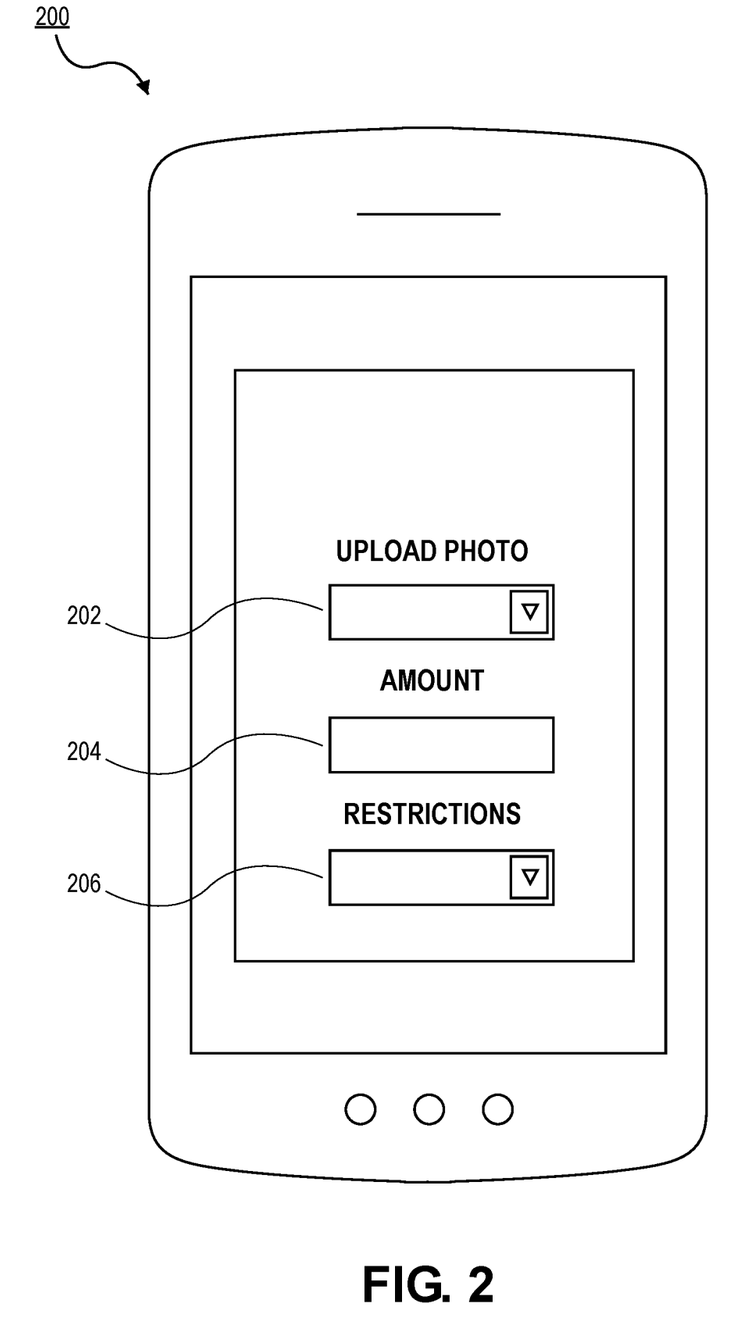
FIGS. 2 and 3 illustrate example interfaces according to some embodiments.

FIG. 2 illustrates an example interface 200 for configuring a value transfer according to some embodiments. As described above with respect to FIG. 1, an interface may be provided (e.g., via first user device 104 and/or access device 105) which can be used by a user to configure a value transfer. In the example depicted in FIG. 2, the interface 200 is displayed via a user device, a smartphone. For example, a first user may install an application on a smartphone for transferring a value to a second user.

Interface 200 is a graphical user interface (GUI) which includes elements for accepting user input to configure a value transfer. The elements may include upload photo element 202, amount element 204, and restrictions element 206.

Upload photo element 202 may include a drop-down menu which a user can interact with to select a photo to upload (thereby providing image data of another user). Upon detecting user interaction with the arrow button on the drop-down, the user device may display a list of images stored on the user device. The user may select an image from the list.

Amount element 204 is an element for accepting user input to provide an amount, i.e., a value to transfer to a second user. Amount element 204 may be a form field in to which a user can type a value (e.g., $50, $100, etc.). As another example, amount element 204 could be a slider bar or drop-down menu which a user may interact with to select an amount from a predefined list of potential values.

Restrictions element 206 is an element for accepting user-input to provide configuration data for restricting use of the specified value. For example, as shown in FIG. 2, the restrictions element 206 may be a drop-down menu. The drop-down menu may, when selected by a user, display a set of potential types of restrictions, such as location, time, and so forth. In some embodiments, upon selecting a type of restriction, the interface may transition to display another interface element for entering data. As a specific example, the user selects "location" from the drop down-menu. The interface 200 displays a modal that includes a field for accepting user input, and the words "enter location."

Upon receiving user input via interface 200, the received information may be stored and/or transmitted by the user device, initiating operations as described above with respect to FIG. 1.

Figure 3:
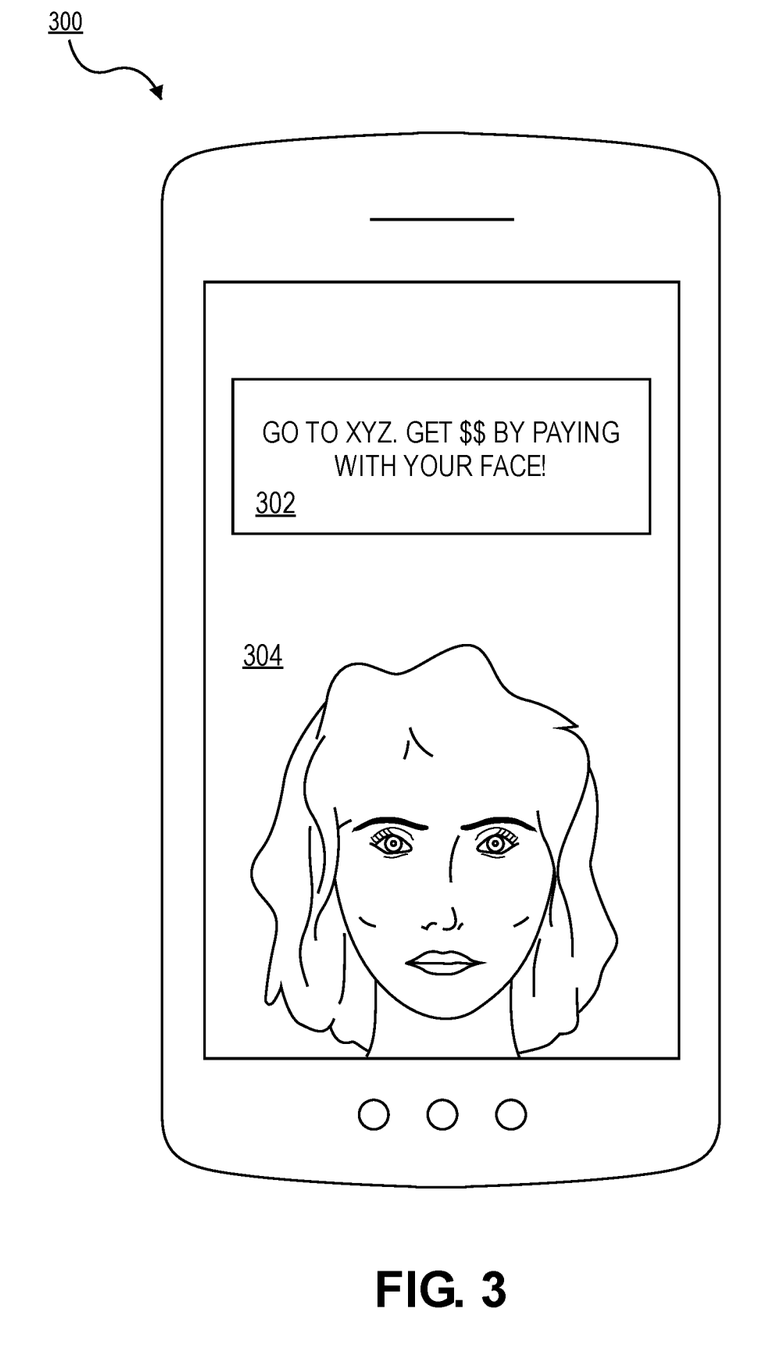

FIG. 3 illustrates an example interface 300 for alerting a recipient of a value transfer according to some embodiments. As described above with respect to FIG. 1, a first user may transfer a value to a second user in association with image data of the second user. Subsequent to the processing of FIG. 1, the server computer may transmit a notification to a second user device, operated by the second user, that the value is available to the second user. For example, the server computer may transmit a text message, email, or the like, to the second user device. The second user device may be substantially similar to the first user device 104, as described above with respect to FIG. 1.

The interface 300 may include a text notification 302. For example, a text message or email may be displayed including text. As illustrated in FIG. 3, for example, the text may be: "Go to XYZ. Get $$ by paying with your face!" The notification may specify the value (e.g., get $100). In some embodiments, the notification may specify a resource provider (e.g., go to XYZ merchant, Joe's Hardware, and so forth). The notification may further provide supplemental information such as the name of the user that provided the value, the nearest location of a chain of stores where the value can be redeemed, and/or the like.

In some embodiments, the interface 300 may further include an image 304 of the recipient user. For example, previously, a first user uploaded a JPEG file showing a second user's face. The server computer may augment the notification with the image 304.

Figure 4:
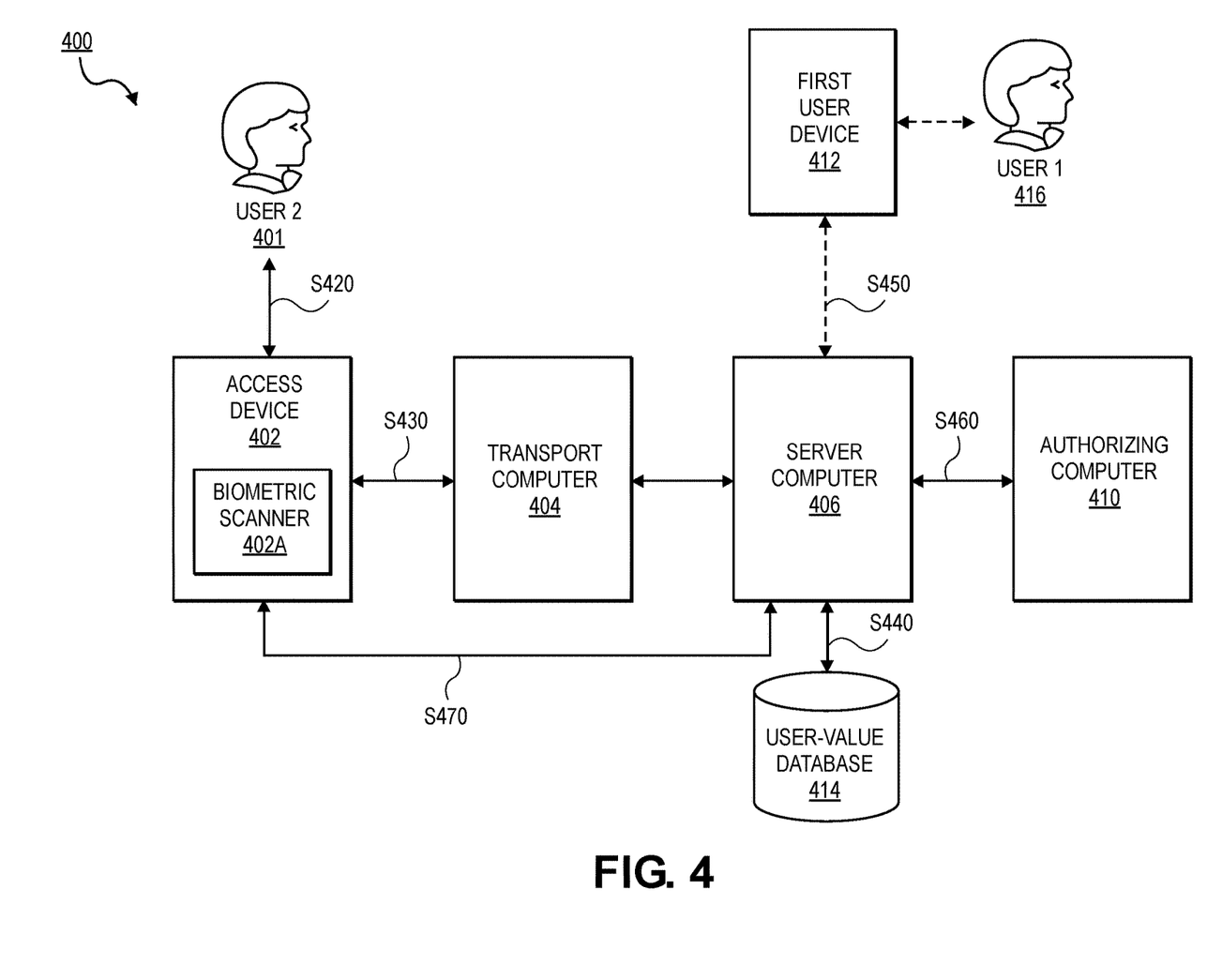
FIG. 4 shows a schematic diagram illustrating techniques for redeeming value via face-recognition according to some embodiments.

FIG. 4 shows a schematic diagram 400 illustrating techniques for redeeming value via face-recognition according to some embodiments. The system of FIG. 4 may include an access device 402 (which may be substantially similar to access device 105 of FIG. 1 and/or access device 600 of FIG. 6), a transport computer 404 (which may be substantially similar to transport computer 107 of FIG. 1), a server computer 406 (which may be substantially similar to server computer 108 of FIG. 1 and/or server computer 500 of FIG. 5), an authorizing computer 410 (which may be substantially similar to authorizing computer 112 of FIG. 1), a user-value database 414 (which may be substantially similar to user-value database 110 of FIG. 1), and a first user device 412 (which may be substantially similar to first user device 104 of FIG. 1). In some cases, a first access device 105 may receive the first image data of user 2 106 as described above with respect to FIG. 1, and a second access device 402 may receive second image data of user 2, as described with respect to FIG. 4.

The components in the system depicted in FIG. 4 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 4. It is understood, however, that embodiments may include more than one of each component. For example, there can be a plurality of access devices 402 in operative communication with the transport computer 404 and/or the server computer 406.

At step S420, user 2 401 may initiate a transaction to redeem a value. User 2 401 may attempt to make a purchase at a store or online. User 2 401 may approach access device 402, and access device 402 may receive information about goods or services to be purchased. Access device 402 may include or be communicatively coupled to a biometric scanner 402A such as a camera. The biometric scanner 402A may obtain image data of the user 2 401. For example, user 2 401 may have her picture taken by camera coupled to a POS device at a store or by a webcam on her computer, resulting in image data. As another example, user 2 401 may have his face scanned upon entering a secure location such as a building or a subway platform.

In some embodiments, access device 402 may process received image data. For example, the access device 402 may generate a biometric template by extracting features from the received image data and generating a mathematical representation of the extracted features. This may result in modified image data for transmission to the server computer 406.

In some embodiments, the access device 402 may capture image data based on received image metadata. Image metadata may include data that supplements an actual image. Examples of metadata may include the time that an image was taken, the type of device used to capture the image, the environmental conditions (e.g., lighting conditions, etc.) surrounding the image capture process, etc. For example, the access device 402 may capture first image data and transmit the first image data to the server computer 406. The server computer 406 may identify stored image data that potentially matches the first image data, but with a low confidence score. The server computer 406 may retrieve stored image metadata associated with the stored image data and transmit the image metadata to the access device 402. The access device 402 may then modify camera settings based on the received image metadata. As a specific example, the stored image data may have been taken with particular lighting and ISO settings. The access device 402 may adjust its lighting and ISO settings so that second image data captured has similar parameters to the stored image data. Using images with similar parameters can provide higher confidence in whether there is or is not a match.

Based on the initiated transaction, the access device 402 may generate access data. The access data may include an amount for the transaction, or may be binary (e.g., one subway ride is initiated). The access data may further include timestamps, merchant identification numbers, location data, and so forth. As a specific example, the access device 402 may store a merchant identifier and merchant location data, which are stored and/or transmitted along with transaction details and user image data. In some embodiments, the access device 402 may convert a biometric sample (a particular image) into a biometric template (e.g., generated image data).

At step S430, access device 402 may transmit the access data and the second image data of the second user to the server computer 406. In some embodiments, the access device 402 may transmit the access data and the second image data of the second user to the server computer 406 in an authorization request message. The access device 402 may transmit the access data and the second image data of the second user to the server computer 406 directly (e.g., over a network via a message and/or API push). Alternatively, the access device 402 may transmit the access data and the second image data of the second user to the transport computer 404, and the transport computer 404 may forward the access data and the second image data of the second user to the server computer 406.

The server computer 406 may receive, from the access device 402 (directly or via the transport computer 404), the access data and the second image data of the second user. The access data and the second image data of the second user may be received in an authorization request message. The server computer 406 may identify the second image data in the received message (e.g., by parsing the message).

At step S440, the server computer 406 may compare the stored first image data of the second user to the received second image data of the second user, and determine whether there is a match. The server computer 406 may use a stored matching algorithm to compare two biometric templates and determine whether there is a match. In some embodiments, the output of the matching algorithm includes a confidence score indicating a likelihood that the stored first image data of the second user matches the received second image data of the second user. The server computer 406 may compare the confidence score to a predefined threshold value to determine whether there is a match.

In some embodiments, the server computer 406 may use multiple match levels, such as no match, low match, intermediate match, and high match. The server computer 406 may generate a confidence score based on applying a matching algorithm to stored and received image data. The server computer 406 may manage different rules for different match levels. Such multiple match levels may be controlled using multiple thresholds. For example, a first threshold may indicate that a match is possible pending further data analysis and a second threshold may indicate a match.

As a specific example, upon determining that the confidence score exceeds a first threshold and the confidence score does not exceed a second threshold, the server computer may request supplemental information. As a specific example, the server computer may request, of user 2, a name or a city of residence. Upon receiving the requested supplemental information from user 2, the server computer may then retrieve a name or city of residence from the user-value data base in association with the image data of user 2. The server computer may compare the received and stored requested information, and, if the information is the same, determine that there is a match.

If there is a match, then, the server computer may identify a stored value and any configuration data stored in association with the second image data of the second user. The server computer may identify the a matching stored biometric template, or other image data, that has been determined to match the second image data of user 2 401. The server computer may identify a stored mapping of the biometric template/image data to the value and/or configuration data.

The server computer 406 may compare the amount in the authorization request message to the identified stored value to determine whether sufficient value is available. The server computer 406 may compare the value stored to the user-value database to an amount specified in the access data. There may be sufficient value available if the stored value meets or exceeds the amount specified in the access data.

In some embodiments, the server computer 406 may make additional comparisons in evaluating the authorization request. For example, if geofencing restrictions are selected, the server computer 406 may compare location data received from the access device 402 to location parameters stored in connection with the value. If the locations do not match, then the server computer 406 may arrive at a negative result. If the locations match, then the server computer 406 may potentially arrive at a positive result. Accordingly, the server computer 406 may determine a result based on configuration data such as location data.

In some embodiments, it may be difficult to compare a stored image data of user 2 401 with a received image data of user 2, because the conditions upon which the two images were obtained may be different. For example, a stored image of user 2 may have been taken under low light, whereas the received image of user 2 may have been taken under bright light. As noted above, in some embodiments, the image data received may include image metadata and this data may include information regarding the circumstances surrounding the capture of the user 2's image at the access device 402. If, for example, the metadata indicates that the image of user 2 was taken under bright light and the stored image was taken under low light, then the received image may be computationally altered to match the low light conditions associated with the stored image. An accurate comparison can then be made of the two images.

At step S450, the server computer may transmit a notification to user 1 416 (e.g., via first user device 412). Step S450 may be performed, for example, in the event of a low match or no match. In the case of a low match, the notification may include an image of user 2 (e.g., the second image data of user 2). User 1 may then confirm or deny that this is the same person. If no match is determined, the server computer 406 may transmit a notification to user 1 416 to warn that someone is attempting to fraudulently redeem the value.

At step S460, the server computer 406 may transmit an authorization request message to authorizing computer 410. The sending of the authorization request message to the authorizing computer 410 may cause the authorizing computer 410 to perform authorization operations. For example, the authorizing computer 410 may receive a PAN of an account of the transferor, use the PAN to identify the account, and determine whether sufficient funds are available in the account. The authorizing computer 410 may generate an authorization result specifying approval or denial. The authorizing computer 410 may prepare and transmit an authorization response message specifying the approval or denial. The server computer 406 may receive the authorization response message.

Alternatively, or additionally, the server computer 406 may authorize access to a resource based on the stored value without communicating with an authorizing computer. For example, the server computer 406 may identify the stored value and authorize the transaction based on determining that the stored value meets or exceeds a transaction amount extracted from the authorization request message. This may be appropriate, for example, in embodiments where the server computer manages a gift instrument. Alternatively, the server computer 406 may transmit an authorization request message to the authorizing computer 410. This may be appropriate, for example, in cases in which the value is to be debited from a preexisting account (e.g., the value is a subset of funds in an account of the first user that transferred the value to the second user).

At step S470, the server computer 406 may transmit an authorization response message to the access device 402. The authorization response message includes the authorization result. The authorization response message may specify a positive result. The server computer 406 may generate a positive result if there is both sufficient value available and a match between the two images of the second user. The positive result may further depend on additional configuration parameters such as location. If there is an overall positive result, then the server computer 406 may proceed by decrementing the stored value by the amount specified in the access data. The server computer may transmit an authorization response message to the access device 402 indicating the positive result. The server computer may transmit the authorization request message to the access device 402 directly and/or via the transport computer 404.

Alternatively, the server computer 406 may determine a negative result. If there is not sufficient value available, then the server computer 406 may generate a negative result, e.g., indicating that the value cannot be redeemed. Alternatively, or additionally, the server computer 406 may reach a negative result based on a lack of an image match and/or a lack of a location match. The server computer 406 may transmit an authorization response message to the access device 402 including the negative result. Upon receiving a negative result, the access device may display a message, e.g., "declined" or "no match."

At the end of the day or at any other subsequent time, a clearing and settlement process for the transaction can occur. As noted above, the server computer 406 could maintain an account with the previously authorized funds from user 1's account. The funds from this account can then be transferred to an account held by the transport computer and associated with a resource provider operating the access device 402. Alternatively, as noted above, funds may be directly sent from the authorizing computer 410 to the transport computer 404 associated with the resource provider operating the access device 402.

Figure 5:
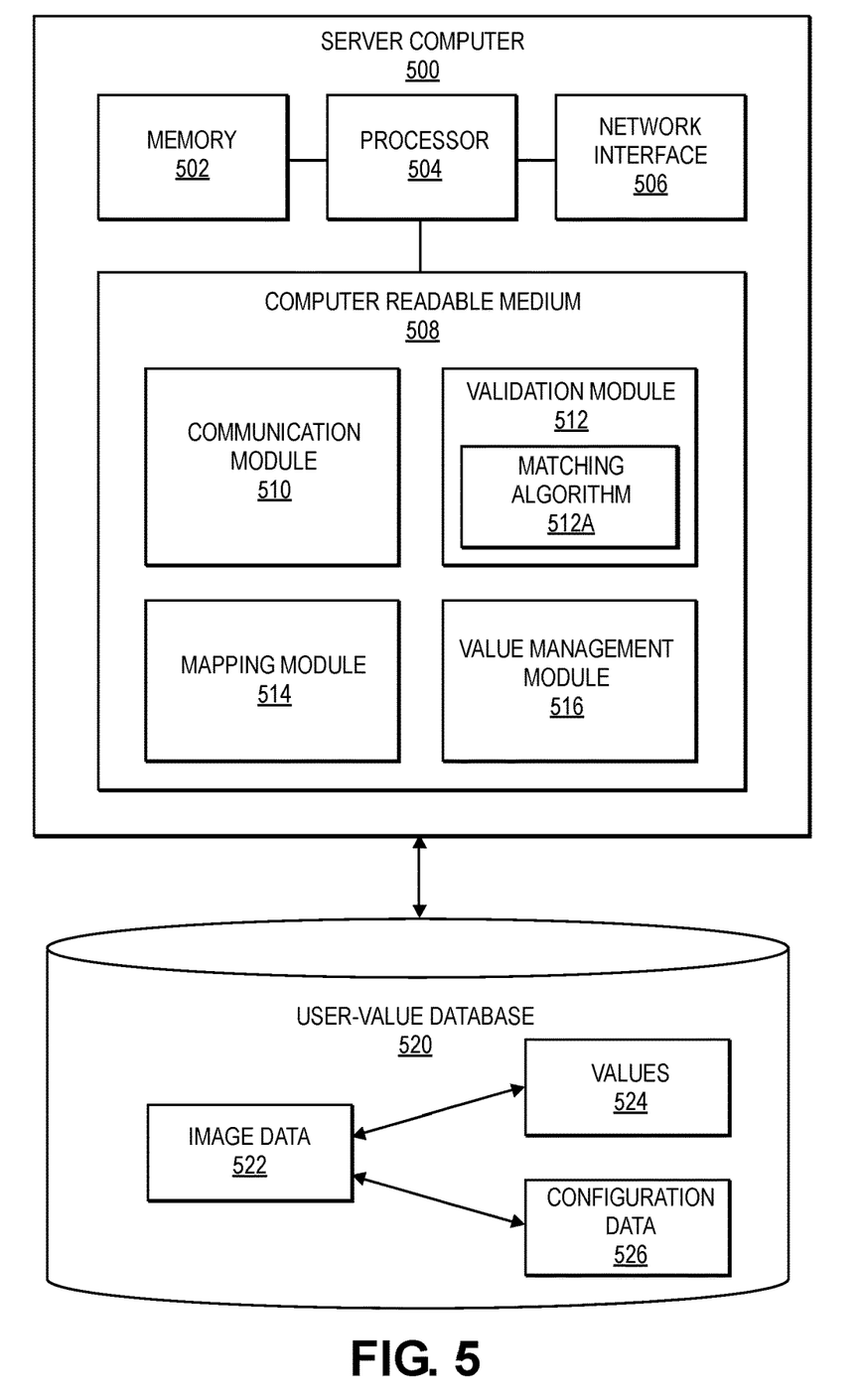
FIG. 5 shows a block diagram of a server computer according to some embodiments.

FIG. 5 illustrates a block diagram of a server computer 500 according to some embodiments. The server computer 500 may comprise a processor 504. The processor 504 may be coupled to a memory 502, a network interface 506, and a computer-readable medium 508. Server computer 500 may include, or be communicatively coupled to, a user-value database 520.

The user-value database 520 may be a storage unit and/or device (e.g., a file system, database, collection of tables, or other storage mechanism) for storing data. The user-value database 520 may include multiple different storage units and/or devices. The user-value database 520 may store image data 522, values 524, and configuration data 526.

Image data 522 may include image files and/or biometric templates. Image data 522 of a particular user may be used to identify a value 524 stored in association with a user. Accordingly, each element of image data 522 is mapped to a corresponding value 524. A value 524 may represent a monetary amount, an amount of times access to a secure location is available, or any other suitable value that can be exchanged for access to a resource.

In some embodiments, image data 522 may further be mapped to a configuration data 526. As described above with respect to FIG. 1, the configuration data may be used to restrict use of a value 524 (e.g., by geofencing, time limitations, and so forth). In some cases, the configuration data 526 includes rules, developed by the server computer, to control such restrictions. For example, an image of John maps to the value $20 and the configuration data 526 based rule "only redeemable in Los Angeles, Calif."

The processor 504 may be implemented as one or more integrated circuits (e.g., one or more single core or multicore microprocessors and/or microcontrollers). The processor 504 may be used to control the operation of the server computer 500. The processor 504 can execute a variety of programs in response to program code or computer-readable code stored in memory. The processor 504 may include functionality to maintain multiple concurrently executing programs or processes.

The memory 502 can be used to store data and code. The memory 502 may be coupled to the processor 504 internally or externally (e.g., cloud based data storage). The memory may be implemented using any combination of any number of non-volatile memories (e.g., flash memory) and volatile memories (e.g., DRAM, SRAM), or any other non-transitory storage medium, or a combination of media.

The network interface 506 may include an interface that can allow the server computer 500 to communicate with external computers. Network interface 506 may enable the server computer 500 to communicate data to and from another device (e.g., access device 105, authorizing computer 112, etc.). Some examples of network interface 506 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 506 may include Wi-Fi™. Data transferred via network interface 506 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 506 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The network interface 506 can utilize a long range communication channel as well as a short range communication channel.

The computer-readable medium 508 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. The computer-readable medium may comprise software code stored as a series of instructions or commands.

The computer-readable medium 508 may comprise code, executable by the processor 504, to implement a method comprising: receiving, from a first user, first image data of a second user and a request to provide a value for the second user; storing the first image data of the second user in association with the value; transmitting, to the second user, a notification that the value is available; receiving, from an access device, an authorization request message comprising access data and second image data of the second user; determining a result based on (a) whether the first image data of the second user matches the second image data of the second user and (b) the stored value; and transmitting, to the access device, an authorization response message comprising the result.

The computer-readable medium 508 may include a communication module 510, a validation module 512, a mapping module 514, and a value management module 516. Each of these modules may include code configured to perform the functions described below in conjunction with the processor 504.

The communication module 510 may comprise code that causes the processor 504 to generate messages, forward messages, reformat messages, and/or otherwise communicate with other entities. For example, the communication module may, in cooperation with processor 504, transmit and receive authorization request messages and authorization response messages.

The validation module 512 may comprise code that causes the processor 504 to validate received image data. The validation module 512 may, cause the processor 504 to initiate validation by comparing received image data to stored image data to identify whether any of the stored image data is a potential match. The validation module 512 may determine a match level between received image data and one or more elements of stored image data.

The validation module 512 may, in cooperation with processor 504, use matching algorithm 512A to perform validation operations. The matching algorithm 512A may, in cooperation with processor 504, compare first image data (e.g. a set of stored biometric templates) with a second image data (e.g., a biometric template based on a second image of user 2 received for redeeming the value) to determine a match result. The matching algorithm 512A may, in cooperation with processor 504, compare features in one or more stored biometric templates (e.g., corresponding to a set of users) to features corresponding to received image data (e.g., a photo or 3D scan of a particular user's face). The matching algorithm 512A may, in cooperation with processor 504, determine, for example, a number of features that match in each template stored and the received image data.

In some embodiments, the matching algorithm 512A may be a machine learning algorithm. The matching algorithm may 512 be trained the matching algorithm on labeled image data. The matching algorithm may be retrained as additional images are received and matched, to increase the accuracy of matches.

Alternatively or additionally, the validation module 512 of server computer 500 may, in cooperation with processor 504, initiate validation, via a request to an external biometrics validation computer (not pictured). The biometrics validation computer may return a validation result to the server computer 500.

The mapping module 514 may comprise code that, in cooperation with processor 504, manages mappings between image data 522, values 524, and configuration data 526. The mapping module 514 may, in cooperation with processor 504, generate mappings between image data 522 and values 524 (and optionally, configuration data 526). For example, an image, value, and time restriction received in a same message are mapped to one another and stored to the user-value database in association with one another (e.g., via a pointer or relational table).

The mapping module 514 may comprise code that, in cooperation with processor 504, identifies information based on a mapping. The mapping module 514 may identify a value based on identified image data. For example, the mapping module 514 may, in cooperation with processor 504, select stored image data of a particular user that matches received image data. The mapping module 514 may, in cooperation with processor 504, identify a stored mapping of the selected image data to a corresponding stored value for that particular user. The mapping module 514 may further, in cooperation with processor 504, identify configuration data mapped to the image data.

The value management module 516 may comprise code that instructs processor 504 to perform processing associated with a value identified by the mapping module 514. The value management module 516 may, in cooperation with processor 504, determine whether a value stored for a user is sufficient to grant access to a resource. The value management module 516 may, in cooperation with processor 504, receive access data including an amount requested (e.g., for a purchase transaction for $29.99). The value management module 516 may, in cooperation with processor 504, compare the amount requested to the value stored. If the value stored meets or exceeds the amount requested, then the value management module 516 may, in cooperation with processor 504, determine that the transaction can proceed. If the value stored does not meet or exceed the amount requested, then the value management module 516 may, in cooperation with processor 504, determine that the transaction should be declined.

Alternatively, or additionally, the value management module 516 may, in cooperation with communication module 510 and processor 504, transmit an authorization request message to an authorizing computer including at least a subset of the access data (e.g., the amount requested and an account identifier). The authorizing computer may determine if an account identified by the account identifier has sufficient funds or credit for the amount requested. The authorizing computer may return an authorization request message to the server computer 500. The value management module 516 of the server computer 500 may, in cooperation with processor 504, analyze the authorization request message to determine whether the transaction should be approved or declined.

In the event the transaction is approved, the value management module 516 may, in cooperation with processor 504, decrement the stored value. For example, for an authorized transaction for $3, the value management module 516 may, in cooperation with processor 504, decrement the stored value for a user (e.g., decrement $50 by $3, to generate an updated stored value of $47).

The server computer 500 may further include data processing subsystems, networks, and operations used to support and deliver authorization services, exception file services, and clearing and settlement services. For example, the server computer 500 may be representative of a transaction processing network. An example transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Figure 6:
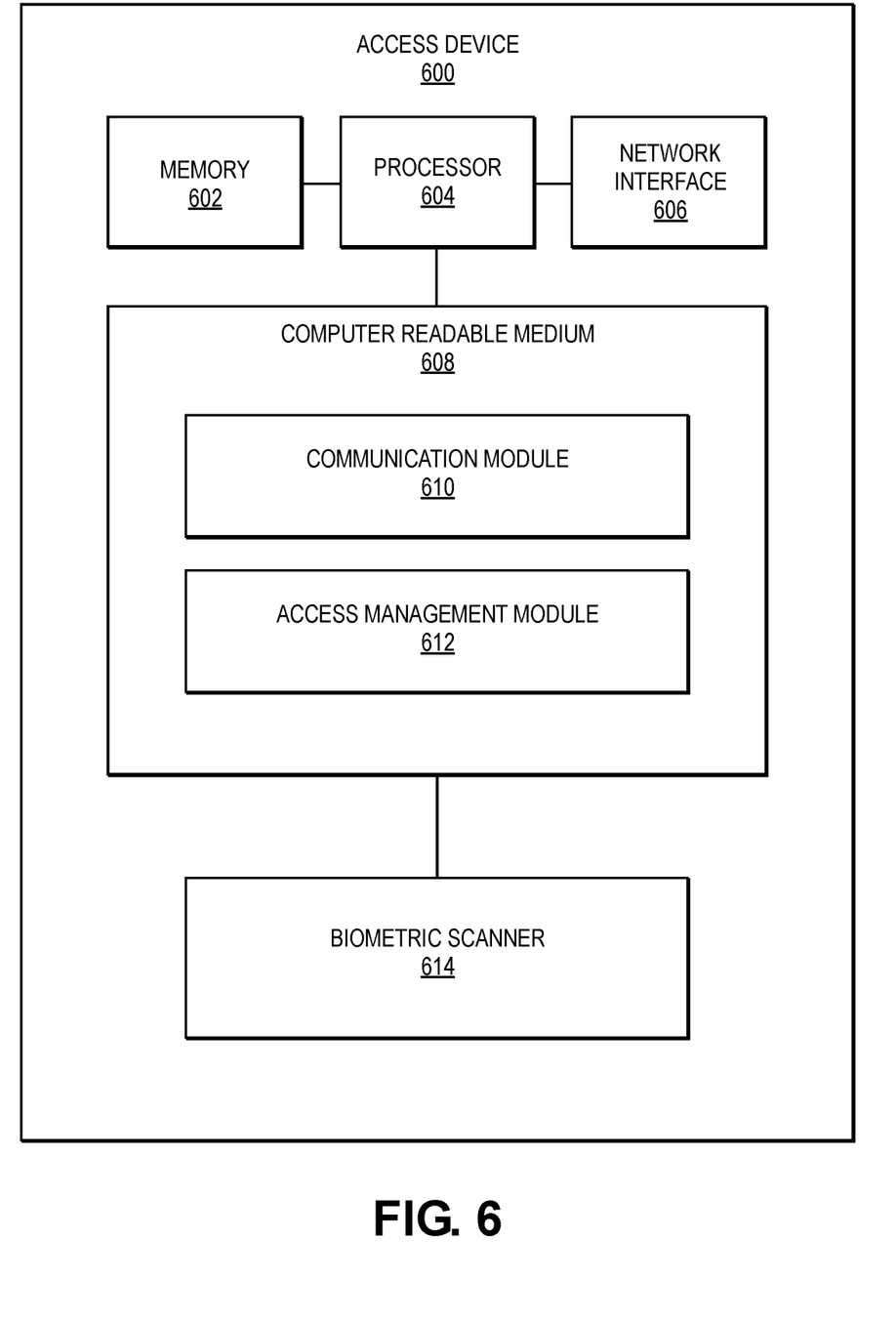
FIG. 6 shows a block diagram of an access device according to some embodiments.

FIG. 6 shows a block diagram of a access device 600 according to some embodiments. The access device 600 may comprise a processor 604. The processor 604 may be coupled to a memory 602, a network interface 606, and a computer-readable medium 608. The access device 600 may further include, or be communicatively coupled to, a biometric scanner 614.

The biometric scanner 614 may include hardware and/or software configured to obtain a biometric sample. For example, the biometric scanner 614 may be a camera configured to capture an image of a user. In some embodiments, the biometric scanner 614 may be adapted to obtain face data. For example, the biometric scanner 614 may be a three-dimensional (3D) face scanner.

The memory 602, processor 604, and network interface 606 may be substantially similar to the memory 502, processor 504, and network interface 506, as described above with respect to FIG. 5.

In some embodiments, the computer-readable medium 608 comprises code, executable by the processor 604, to implement a method comprising receiving, by an access device, access data and second image data of a second user; preparing, by the access device, a request message comprising the access data and the second image data of the second user; transmitting, by the access device to a server computer, the request message, wherein the server computer compares the second image data of the second user to first image data of the second user, wherein the first image data was received from a first user with a request to provide a value for the second user, and wherein the server computer transmits a response message to the access device indicating whether the request is approved or declined based on the comparison; and receiving, by the access device from the server computer, the response message indicating whether the request is approved or declined.

The computer-readable medium 608 may include a communication module 610 and an access management module 612. Each of these modules may include code configured to perform the functions described below in conjunction with the processor 604.

The communication module 610 may comprise code that causes the processor 604 to generate messages, forward messages, reformat messages, and/or otherwise communicate with other entities. For example, the communication module 610 may, in cooperation with processor 604, generate and transmit authorization request messages and receive and process authorization response messages.

The access management module 612 may comprise code that causes the processor 604 to manage requests for access to a resource. The access management module 612 may, in cooperation with processor 604, prepare access data, which may include information received from a user interaction (e.g., by scanning goods to purchase) and/or information stored or generated by the access management module (e.g., an access device identifier, a timestamp, and so forth).

The access management module 612 may, in cooperation with processor 604, retrieve image data. The access management module may, in cooperation with processor 604, receive image data from the biometric scanner 614. For example, the access management module 612 may receive a digital photograph of a user from biometric scanner 614. The access management module 612 may, in cooperation with processor 604, process the received photograph (e.g., by extracting features and converting the features to a mathematical representation).

The access management module 612 may, in cooperation with processor 604, process a message (e.g., an authorization response message) specifying whether access to a resource should be granted, and initiate an appropriate action. For example, the access management module 612 may, in cooperation with processor 604, receive an authorization response message via communication module 610. The access management module may, in cooperation with processor 604, parse the authorization response message to extract a result (e.g., approval or denial). If the access to a resource is approved, the access management module may, in cooperation with processor 604, initiate granting access to a resource (e.g., by instructing an operator to complete a purchase transaction, instructing a door to open, and so forth). If the access to a resource is approved, the access management module may, in cooperation with processor 604, initiate refusing access to a resource (e.g., by causing display of a notification, such as "declined" or "insufficient funds").

Embodiments provide several advantages. Security is improved over traditional gift instruments, which do not typically have any means of tying the value to a particular recipient. In contrast to traditional gift instruments that can be easily stolen, the value transfers described herein are securely unlocked by the recipient's face. Additionally, there is low friction on both the giver and the receiver. The giver only needs to specify the value and present the image of the receiver. The receiver only needs to show her face, without the need to keep track of cards, numbers, or the like.

Additional advantages enable use of a casual snapshot to generate a biometric template. Traditionally, a facial image used to generate a biometric template must be taken under controlled conditions. For example, a specialized facial scanner may be required. As another example (e.g., for passport photos), the subject must have his or her face at a particular angle, with particular lighting and facial expressions. Traditional facial recognition processing does not perform well without images taken under such controlled conditions. Embodiments provide multiple solutions to these problems. The system may generate a biometric template based on multiple photos, each of which, taken alone, may not be sufficient to generate a useable biometric template (e.g., using a machine learning algorithm that recognizes facial features with increased accuracy based on multiple images). The system may perform Internet searches to retrieve additional images. The system may adjust camera settings to match an original photo taken. As yet another example, the server computer may use multiple match levels, such as no match, low match, intermediate match, and high match. The server computer may manage different rules for different match levels, to request supplemental information when needed (e.g. user confirmation or additional information about the user).

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations may become apparent to those skilled in the art upon review of the disclosure. The scope of the disclosure can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a," "an," or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a server computer from a first user device of a first user, first image data of a second user and a request to provide a value for the second user;
storing by the server computer, the first image data of the second user in association with the value to a user-value database that maps the first image data to the value;
transmitting, by the server computer to a second user device of the second user, a notification that the value is available;
receiving, by the server computer from an access device, an authorization request message comprising access data and second image data of the second user, the second image data captured by the access device and the access data comprising an amount to redeem from the value;
identifying, by the server computer using the second image data, the first image data and the stored value in the user-value database;
determining a result based on (a) whether the first image data of the second user matches the second image data of the second user and (b) whether the stored value meets or exceeds the amount to redeem; and
transmitting, to the access device, an authorization response message comprising the result.

2. The method of claim 1, wherein the result is further determined based on location data received from the access device.

3. The method of claim 1, further comprising decrementing the stored value based on the access data.

4. The method of claim 1, wherein the second image data comprises a digital image received from the first user device operated by the first user.

5. The method of claim 1, wherein the first image data and the request to provide the value are received from an application on the first user device operated by the first user.

6. The method of claim 1, wherein determining whether the first image data of the second user matches the second image data of the second user comprises:
   comparing the first image data of the second user to the second image data of the second user;
   determining a confidence score based on the comparison;
   determining that the confidence score exceeds a threshold; and
   based on determining that the confidence score exceeds the threshold, determining that the first image data of the second user matches the second image data of the second user.

7. The method of claim 1, wherein determining whether the first image data of the second user matches the second image data of the second user comprises:
   comparing the first image data of the second user to the second image data of the second user;
   determining a confidence score based on the comparison;
   determining that the confidence score does not exceed a threshold; and
   based on determining that the confidence score does not exceed the threshold, determining that the first image data of the second user does not match the second image data of the second user.

8. The method of claim 1, wherein determining whether the first image data of the second user matches the second image data of the second user comprises:
   comparing the first image data of the second user to the second image data of the second user;
   determining a confidence score based on the comparison;
   determining that the confidence score exceeds a first threshold and the confidence score does not exceed a second threshold; and
   based on determining that the confidence score exceeds the first threshold and the confidence score does not exceed the second threshold, initiating a request for supplemental information.

9. The method of claim 1, wherein determining the result based on the stored value comprises:
   identifying an amount based on the access data;
   comparing the amount to the stored value; and
   determining that the stored value meets or exceeds the amount.

10. A server computer comprising:
    a processor; and
    a non-transitory computer readable medium operatively coupled to the processor, the non-transitory computer readable medium comprising code executable by the processor for performing a method comprising:
    receiving, from a first user device of a first user, first image data of a second user and a request to provide a value for the second user;
    storing the first image data of the second user in association with the value to a user-value database that maps the first image data to the value;
    transmitting, to a second user device of the second user, a notification that the value is available;
    receiving, from an access device, an authorization request message comprising access data and second image data of the second user, the second image data captured by the access device and the access data comprising an amount to redeem from the value;
    identifying, using the second image data, the first image data and the stored value in the user-value database;
    determining a result based on (a) whether the first image data of the second user matches the second image data of the second user and (b) whether the stored value meets or exceeds the amount to redeem; and
    transmitting, to the access device, an authorization response message comprising the result.

11. The server computer of claim 10, wherein the result is further determined based on comparing location data received from the access device to location parameters stored in association with the value.

12. The server computer of claim 10, wherein:
    the result is to grant access to a resource based on determining that the first image data of the second user matches the second image data of the second user; and
    the method further comprises decrementing the stored value based on the access data.

13. The server computer of claim 10, wherein the second image data comprises a digital image received from the first user device operated by the first user.

14. The server computer of claim 10, wherein the first image data and the request to provide the value are received from an application on the first user device operated by the first user, wherein the application and the access device are associated with a resource provider.

15. The server computer of claim 10, wherein determining whether the first image data of the second user matches the second image data of the second user comprises:
    comparing the first image data of the second user to the second image data of the second user;
    determining a confidence score based on the comparison;
    determining that the confidence score exceeds a threshold; and
    based on determining that the confidence score exceeds the threshold, determining that the first image data of the second user matches the second image data of the second user.

16. The server computer of claim 10, wherein determining whether the first image data of the second user matches the second image data of the second user comprises:
    comparing the first image data of the second user to the second image data of the second user;
    determining a confidence score based on the comparison;
    determining that the confidence score does not exceed a threshold; and
    based on determining that the confidence score does not exceed the threshold, determining that the first image data of the second user does not match the second image data of the second user.

17. The server computer of claim 10, wherein determining whether the first image data of the second user matches the second image data of the second user comprises:
    comparing the first image data of the second user to the second image data of the second user;
    determining a confidence score based on the comparison;
    determining that the confidence score exceeds a first threshold and the confidence score does not exceed a second threshold; and
    based on determining that the confidence score exceeds the first threshold and the confidence score does not exceed the second threshold, initiating a request for supplemental information.

18. A method comprising:
- capturing, by an access device, second image data of a second user;
- receiving, by the access device, access data comprising an amount to redeem;
- preparing, by the access device, a request message comprising the access data and the second image data of the second user;
- transmitting, by the access device to a server computer, the request message, wherein the server computer identifies first image data of the second user and a stored value in a user-value database using the second image data of the second user and compares the second image data of the second user to the first image data of the second user, wherein the first image data was received from a first user with a request to provide a value for the second user, and wherein the server computer transmits a response message to the access device indicating whether the request is approved or declined based on the comparison; and
- receiving, by the access device from the server computer, the response message indicating whether the request is approved or declined.

* * * * *